United States Patent [19]
Kilbane

[11] Patent Number: 5,829,490
[45] Date of Patent: Nov. 3, 1998

[54] APPARATUS FOR MAKING A WREATH RING

[76] Inventor: Dennis J. Kilbane, 1878 Pascal St., St. Paul, Minn. 55113

[21] Appl. No.: 855,796

[22] Filed: May 12, 1997

[51] Int. Cl.⁶ .................................................. B21F 15/08
[52] U.S. Cl. ........................................ 140/71 R; 140/112
[58] Field of Search .................................. 140/71 R, 88, 140/112

[56] References Cited

U.S. PATENT DOCUMENTS

| | | |
|---|---|---|
| 1,617,188 | 2/1927 | Woerner . |
| 1,729,171 | 9/1929 | Lavley . |
| 1,796,899 | 3/1931 | Smyser . |
| 2,740,218 | 4/1956 | Miller .......................................... 41/12 |
| 3,008,496 | 11/1961 | Goddard .................................. 140/112 |
| 3,050,890 | 8/1962 | Bloch .......................................... 41/12 |
| 3,327,739 | 6/1967 | Harper ..................................... 140/112 |
| 3,330,306 | 7/1967 | Rudd ....................................... 140/112 |
| 3,780,514 | 12/1973 | Rodermund et al. ...................... 57/156 |
| 4,277,885 | 7/1981 | Scudder ..................................... 29/780 |
| 4,335,758 | 6/1982 | Williams .................................... 140/88 |
| 4,609,989 | 9/1986 | Squarci ..................................... 364/468 |
| 4,964,932 | 10/1990 | Miller ...................................... 156/174 |
| 5,207,758 | 5/1993 | Royalty .................................. 47/41.13 |
| 5,247,729 | 9/1993 | Carmichael ............................ 29/243.5 |
| 5,255,421 | 10/1993 | Kamysiak ............................ 29/243.56 |

*Primary Examiner*—Lowell A. Larson
*Attorney, Agent, or Firm*—Nawrocki, Rooney & Sivertson, P. A.

[57] ABSTRACT

Wreath ring making machine having a ram torque stabilizer and an angle plate for imparting an offset angle to one rib arm. The wreath ring has a circular spine and C-shaped ribs disposed about the spine, the ribs having a back and two arms. The machine includes a pneumatic cylinder having a central axis connected to a ram, which is connected to a female die, which moves against a male die. A frame running parallel to the cylinder axis has the cylinder attached at the distal end and the male die attached at the proximal end. The stabilizer includes a stabilizer bracket attached at an intermediate portion of the frame and a corresponding stabilizer follower attached to the ram, where the stabilizer follower is slidably received by the stabilizer bracket, and stabilizes against torque in the ram and cylinder. The stabilizer significantly reduces torque on the cylinder and the resulting maintenance. The angle plate is attached to an inside face of the female die, which forces the corresponding rib arm to assume an angle offset relative to the opposite arm.

21 Claims, 6 Drawing Sheets

APPARATUS FOR MAKING A WREATH RING

FIELD OF THE INVENTION

The present invention relates generally to an apparatus for bending, cutting, and spot welding wire pieces to form a wreath ring. More specifically, the present invention relates to a machine for making circular wire rings having transverse ribs for subsequent use in making wreaths.

BACKGROUND OF THE INVENTION

Decorative wreaths are commonly seen over the Christmas holidays, especially in northern climates. They are most often formed of evergreen, grown and man-made, and/or flowers, branches, or vines and other materials. Wreaths also have other uses, such as for hobbies, crafts or other purposes. Wreaths are commonly round and placed on doors and walls. The evergreen (or other material) can be most easily formed into the circular, wreath shape utilizing circular wire wreath rings. A wreath ring commonly includes a spine formed into a circle with the ends spot welded together. Ribs are disposed about the circular ring, having a back portion and an arm on either side of the ring, disposed toward the front. The ribs can have a semi-circular or C-shape open to the front. In use, the wreath rings have evergreen (or other material) curved and laid into the open rib arms. The two rib arms are closed past each other and over (or through) the evergreen branches, tightly so as to go largely unnoticed relative to the larger evergreen branches.

Wreath rings have been made utilizing a variety of methods, which include numerous operations, some of which were performed by hand, some of which were performed by machine, or a combination of both. One method is to form a substantially circular wire, weld the ends together, and weld short rib pieces transverse to the circular wire, each step requiring a separate machine. Another method is to utilize a machine which automatically forms a spine wire into a ring, and manually positioning the ribs about the spine wire for welding in place.

It is desirable to have a wreath ring making machine having the capability of automatically forming the spine wire into a ring, and cutting, shaping and welding the ribs about the spine wire, without requiring excessive maintenance due to equipment wear. It is also desirable to have a wreath ring making machine capable of producing ring ribs which more easily and predictably close over one another.

SUMMARY OF THE INVENTION

The present invention includes a machine for making circular wire rings having transverse U-shaped or C-shaped ribs disposed about the rings, for subsequent use in making decorative wreaths. In use, the rings have evergreen or other decorative items laid within the open ribs, and the ribs closed over each other and the branches or other items retained within, forming a wreath.

In one embodiment, the present invention includes an apparatus for use in making wreath rings. The apparatus includes a frame and spine wire feeding system for feeding a spine wire in a general ring shape. A rib wire feed is provided, wherein the rib wire feeds a rib wire which may be substantially perpendicular to the spine wire. A controller is provided for selectively controlling the rib wire feed and the clip wire feed. A rib forming mechanism is provided for shaping and cutting the rib wire to form a wreath holding member, and for coupling the wreath holding member to the spine wire at the location where they cross. Means, coupled between the rib forming mechanism and the frame, are provided for stabilizing the rib forming mechanism during operation of forming the wreath holding member.

The rib forming mechanism may include a hydraulically actuated cylinder mechanism, wherein the means for stabilizing is coupled to the hydraulically actuated cylinder mechanism. The means for stabilizing is carried by the cylinder mechanism. The means for stabilizing may include a stabilizer bracket fixedly attached to the frame and a stabilizer follower fixedly attached to the cylinder mechanism. The stabilizer bracket may be adapted to slidably mate with the stabilizer follower in the direction of operational movement of the cylinder mechanism (torsional movement). The stabilizer bracket and the stabilizer follower prohibit movement in a direction transverse to the operational movement of the cylinder mechanism. The stabilizer bracket may include a generally longitudinal groove, wherein the stabilizer follower includes a generally longitudinal ridge shaped for slidable receipt within said longitudinal groove.

The means for stabilizing may stabilize the rib forming mechanism against movement transverse to the direction of operational movement of the rib forming mechanism. The present invention may further include means for offsetting the wreath holding member. The means for offsetting the wreath holding member may be coupled to the rib forming mechanism. In one embodiment, the rib forming mechanism includes a die having a generally U-shaped wire forming surface, and wherein the means for offsetting the wreath holding member includes an angle plate, wherein the angle plate is coupled to the U-shaped wire forming surface.

In another embodiment, the present invention is an apparatus for use in making wreath rings. The apparatus includes a spine wire, a rib wire, and a rib forming mechanism capable of receiving the spine wire and the rib wire for shaping and cutting the rib wire to form a wreath holding member, and for coupling the wreath holding member to the spine, wherein the rib forming mechanism includes an offsetting mechanism for offsetting the wreath holding member.

The apparatus may include means for feeding the spine wire into the rib forming mechanism and means for feeding the rib wire into the rib forming mechanism. The rib forming mechanism may further comprise a first die having a wire forming surface, wherein the offsetting mechanism includes an angle plate, wherein the angle plate is coupled to the wire forming surface. The wire forming surface may be generally U-shaped or C-shaped.

The rib forming mechanism may further include a second die, and means for moving the first die relative to the second die to form the rib wire about the wire forming surface. Torque stabilizing means may be provided for stabilizing the means for moving during movement of the first die relative to the second die. The torque stabilizing means may stabilize against forces in a direction generally perpendicular to the direction of movement of the means for moving.

In one embodiment, the wreath forming mechanism forms the rib wire into a generally U-shaped or C-shaped member, wherein the U-shaped member includes a first leg, a second leg, and an intermediate leg, and wherein the first leg and the second leg are coupled to the intermediate leg at opposite ends, and wherein the offsetting mechanism provides an angular offset to the second leg relative to a plane defined by the first leg and the intermediate leg.

In another embodiment, the wreath forming mechanism in accordance with the present invention includes means for providing force proximally along an axis, means for axially transferring the provided force, means for feeding a spine wire, and means for feeding a rib wire. A machine embodying the present invention also includes a die assembly having a female and a male die. The die assembly has an open and a closed position. The closed position results from the female die closing on the stationary male die. A frame runs substantially parallel to the axis along which the force is provided, and has the force providing means fixedly attached to a frame portion and the male die fixedly attached to a fixed frame portion.

The female die has a rib wire guide and the male die has a spine wire guide in one embodiment. In the region of the die assembly, the spine and rib wires are transverse to each other and to the force axis. The die assembly inner dimension is such that the spine and rib wires are forced to intersect when the die assembly is in the closed position. The die assembly also has a cutting means, preferably a cutting blade mounted on the female die and a cutting anvil mounted on the male die, which operate to cut the rib wire into lengths for forming the C-shaped rib sections. The female die inner shape and corresponding male die shape operate to force a C-shape on the cut rib wire. The C-shape includes a relatively flat back portion and a right and left arm. The machine also includes means for spot welding the intersecting rib and spine wires, as well as means for imparting an offset angle of one arm relative to the other arm, to avoid arm collision when the end user closes the arms over one another.

One embodiment of the present invention utilizes a pneumatic cylinder to provide force along the cylinder axis and a ram to transfer the force along the axis. The cylinder is attached to a moving portion of the frame. The ram can be formed as a box having a slidable welding electrode shuttle assembly within. One end of the ram is connected to the sliding part of the cylinder. The other end of the ram is connected to the female die. The male die is connected to a fixed portion of the frame.

A stabilizer is provided for providing stabilization to the slidable ram against torque, which results from the female die pressing against the male die and intersecting wires and cutting the rib wire. The stabilizer preferably includes a top stabilizer bracket attached to the frame and having a lower channel or ear, and a stabilizer follower attached to the ram and having a bar shaped track or rail, adapted to be slidably received by the stabilizer bracket ear. In one embodiment, the track has a groove and the bracket a corresponding ridge.

The present invention may further include an angle plate for imparting an offset angle into the rib arms. The angle plate is affixed to an interior, side face of the female die. The plate has a working surface, which is perpendicular to the side face and angled relative to the force or cylinder axis. When the cut rib arm wire is forced into the female die by the male die, the arm lying near the angle plate is forced by the working surface of the plate to assume an angle offset relative to the plane of the opposite rib arm and the rib back. The offset angle allows the arms to be folded on one another without colliding.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof, and wherein.

DETAILED DESCRIPTION OF THE PREFERRED EMBODIMENTS

The present invention includes a single wreath ring making apparatus which performs the operation of bending, cutting and spot welding wire pieces to form a wreath ring using a centralized apparatus or system. In particular, the wreath ring making machine in accordance with the present invention automatically forms the spine wire into a ring, and cuts, shapes and welds a rib wire about the spine wire. The wreath ring making machine in accordance with the present invention does not require excessive maintenance from equipment wear due to torsional forces present as a result of the wreath ring making process due to torque stabilizing mechanisms which stabilize the wreath ring making machine from torsional forces which are generally perpendicular to the direction of movement of the wreath ring making machine, while allowing movement in the direction of operational movement of the wreath ring making machine. Further, the wreath ring making apparatus in accordance with the present invention is capable of producing ring ribs which more easily and predictably close over one another, solving problems inherent in previous wreath ring rib designs.

Figure 1:
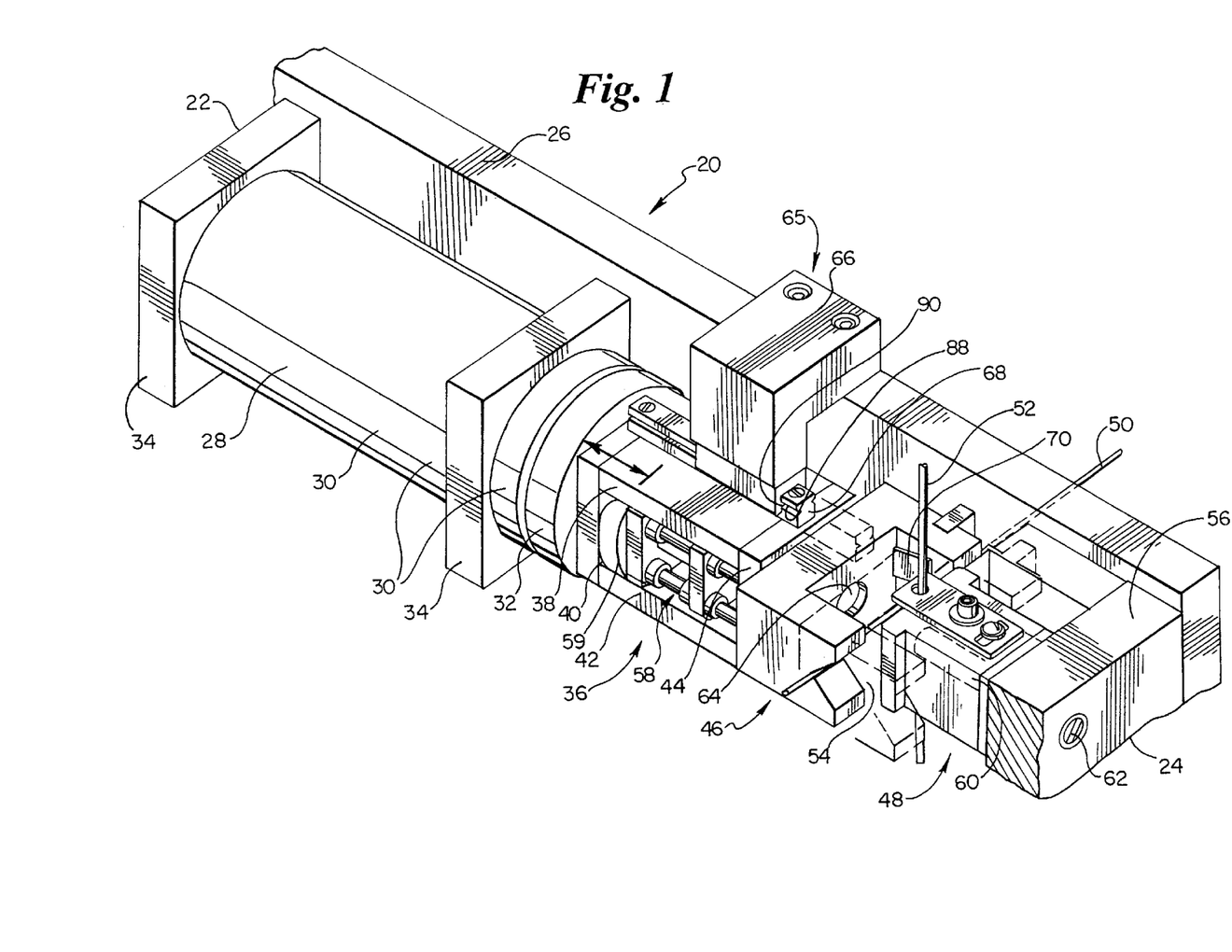
FIG. 1 is a fragmentary perspective view of a wreath ring making apparatus in accordance with the present invention.

FIG. 1 illustrates a wreath ring making machine 20 in accordance with the present invention having a movable or female end 22, a stationary or male end 24 and a main frame 26. A pneumatic cylinder 28 includes a fixed cylinder portion 30 and a slidable, movable cylinder portion 32, which provides an axially directed force for the machine 20. Fixed cylinder portion 30 is attached to frame 26 with cylinder mounting blocks 34. A ram 36 is attached to cylinder slidable portion 32. Ram 36 acts to transfer the forward or axial force provided by cylinder 28. Ram 36 includes a top plate 38, a distal plate 40, a bottom plate 42 and a front plate 44 which form a ram frame for transferring the pneumatic cylinder 28 force.

Attached to ram front plate 44 is a female die 46 shown in open position, having a rib wire 50 fed therethrough. A male die 48, located in front of or adjacent female die 46, is mounted to frame 26 with a batten 56, and has a spine wire 52 fed therethrough. Female die 46 and male die 48 include a die cavity 54 therebetween, for receiving, forming, and welding spine wire 52 and rib wire 50. An angle plate 70 is provided within die cavity 54 for aiding in directing and shaping the rib wire 50 as it is fed therethrough. Rib wire 50 and spine wire 52 are preferably formed of steel or stainless steel, with spine wire 52 being 0.030–0.250 inches in diameter and rib wire 50 being 0.030–0.125 inches in diameter for rib.

Cylinder 28 defines a cylinder axis extending through the center of the cylinder, through ram 36, and through female die 46 and male die 48. Spine wire 52, near the die assembly, defines a spine wire axis which is perpendicular to the cylinder axis. Rib wire 50, near the die assembly, defines a rib wire axis which is perpendicular to both cylinder axis and spine wire axis. In the embodiment shown, the spine wire axis is vertical and the rib wire axis is horizontal. Machine 20 includes means for spot welding including an electrode 60 having anode portion 62 extending through the male die 48. A cathode aperture 64 lies within female die 46. A spot weld shuttle assembly 58 coupled to a second pneumatic cylinder 59 lies within the frame of ram 36, allowing a moving electrode or cathode 61 to travel on sleeve bearings along rods, the second pneumatic cylinder 59 bringing the cathode 61 to the crossed wires for spot welding.

The process of bending and cutting the wreath spine and rib wire requires millions of machine cycles in a season, requiring efficient machinery that does not require frequent maintenance. The degree of accuracy required in bending and cutting the wire must be sufficient to allow repeatedly spot welding the ribs and spine at their intersection. The force required to bend and cut the wire is sufficient to require a pneumatic cylinder of significant size, precision and cost. Due to the nature of the demands placed on the cylinder, previous machines have developed significant problems with torque on the pneumatic cylinder, causing excessive wear, and premature and unpredictable failure. The present invention includes a stabilizer mechanism or means for stabilizing to reduce wear on the pneumatic cylinder during the wreath ring forming process.

In particular, the present invention includes a stabilizer mechanism 65 including a stabilizer bracket 66 attached to frame 26, which slidably receives a stabilizer follower 69, attached to ram 36 at top plate 38. The stabilizing mechanism 65 provides for stabilization of the wreath ring making machine 20 during the wreath ring making process. In particular, the stabilizing mechanism 65 allows for stabilization against forces which are generally torsional or perpendicular to the direction of movement of the pneumatic cylinder 28 and the second pneumatic cylinder 59, yet allowing movement in a direction in alignment with the operational movement of the first pneumatic cylinder 28 and the second pneumatic cylinder 59.

Figure 2:
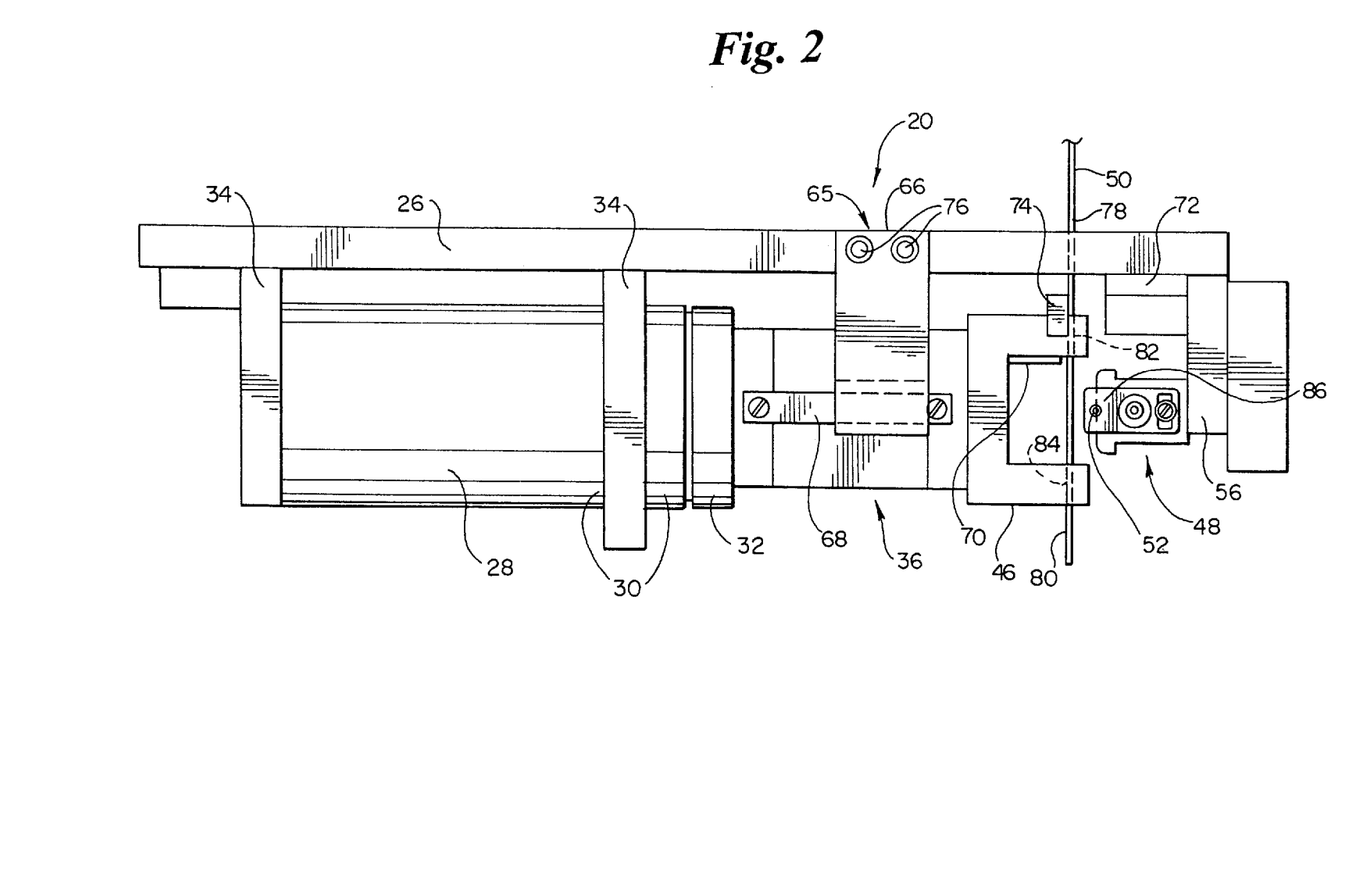
FIG. 2 is a top plan view of the apparatus of FIG. 1.

Referring now to FIG. 2, machine 20 is illustrated from the top. Stabilizer bracket 66 may be seen mounted to frame 26 utilizing stabilizer bracket mounting holes 76. Stabilizer follower 68 is mounted to ram 36. Rib wire 50 extends from a feed wire end 78, through a first rib wire guide 82 and a second rib wire guide 84 in female die 46, terminating in rib wire free end 80.

Rib wire 50 is cut between a moving cutter blade 74 fixedly attached to female die 46 and a stationary cutter anvil 72, fixedly attached to frame 26 and male end 24. Spine wire 52 may be seen extending through a spine wire guide 86 in male die 48. As may be seen by studying FIG. 2, when female die 46 moves toward male die 48, after rib wire 50 is cut, rib wire 50 is formed between the male and female dies, assuming the shape of the female die inside faces. In one preferred embodiment, the shape is generally U-shaped or C-shaped. Spine wire 52 is held stationary. Any asymmetry in machine 20 affecting the resistance to the applied force of the cylinder to the wires or male die 48 may be seen to cause torque along the cylinder axis. This torque, unabated, causes excessive wear on cylinder 28, leading to early replacement and unpredictable equipment failure. Without either stabilizer bracket 66 or stabilizer follower 68, ram 36 is not sufficiently stabilized along cylinder 28, leaving a long cantilevered arm susceptible to torque and the damage resulting therefrom.

Examination of FIG. 2 illustrates at least two asymmetries leading to torque. First, only one side of female die 46 has a cutting blade attached. This causes a substantial force on one side of female die 46, but not the other. Second, angle plate 70, designed to twist one of the rib wire arms, causes an upward movement of one side of female die 46, as the other side does not have an angle plate. Stabilizer bracket 60, in the embodiment illustrated best in FIG. 1, has a channel for receiving the corresponding bar shaped stabilizer traveller track 68. In the embodiment shown, stabilizer bracket 66 has a rib or ridge 90, and stabilizer follower track 68 a corresponding groove 88.

Figure 3:
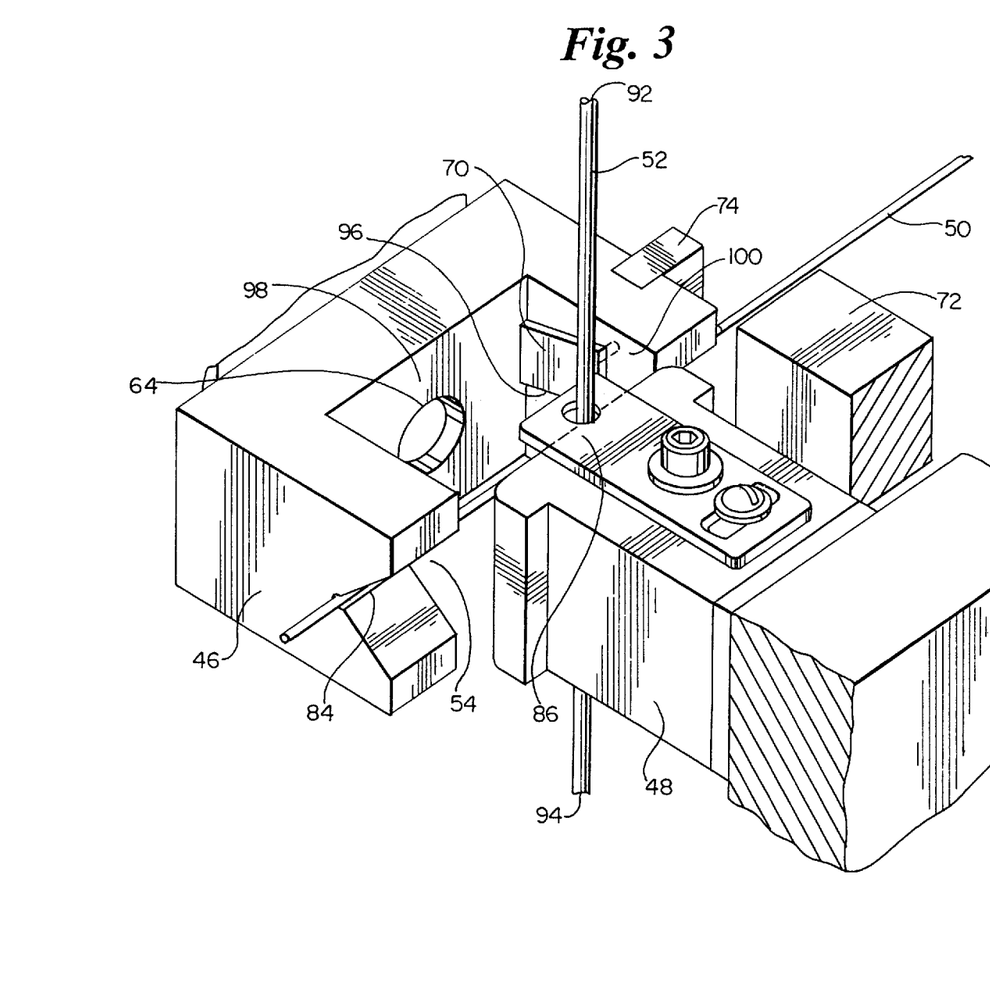
FIG. 3 is a fragmentary perspective view including the die assembly and wire feed portions of the machine of FIG. 1.

Referring now to FIG. 3, spine wire 52 is illustrated in more detail, having, near female die 46, a feed wire end 92 and a free wire end 94, where free wire end 94 is bent into a curved circular wring wreath shape. Male die 48 has spine wire guide 86 mounted on top. Female die 46 has spine wire 50 extending through second spine wire guide 84, which in the embodiment shown, is a notch. Female die 46 includes a die back face 98 and a die side face 100, where angle plate 70 is attached to side face 100. Angle plate includes a working surface 96, located along the bottom of angle plate 70 in the embodiment shown. Rib wire 50 is held by rib wire guide 84, cut between anvil 72 and blade 74, and shaped into a U-shape or C-shape between male die 48 and female die 46. As female die 46 moves proximally toward male die 48, after the feed end of the spine wire has been cut, the rib wire segment assumes a shape having an arm corresponding to each female die side face, and a back or intermediate leg, corresponding to female die back face 98. The arm of the rib wire near angle plate 70 may initially assume the same geometry as the opposite arm. As the inside axial dimension of cavity 54 becomes smaller, rib wire 50 is forced to travel along working surface 96 of angle plate 70. As the female die progresses ahead, the right end of the arm is forced lower while the left end of the arm remains higher, held by first rib wire guide 82 (not shown in FIG. 3).

Figure 4:
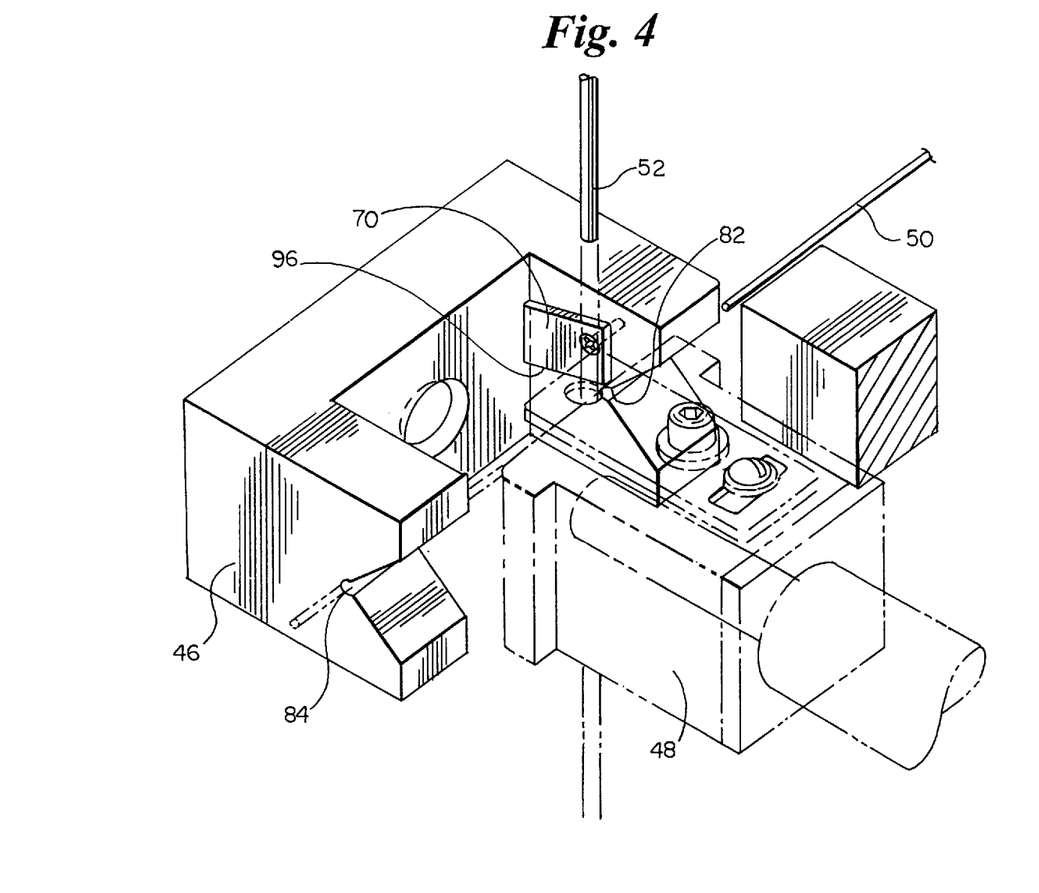
FIG. 4 is a fragmentary perspective view similar to FIG. 3, with male die and wires shown in phantom, having die assembly in open position.
Figure 5:
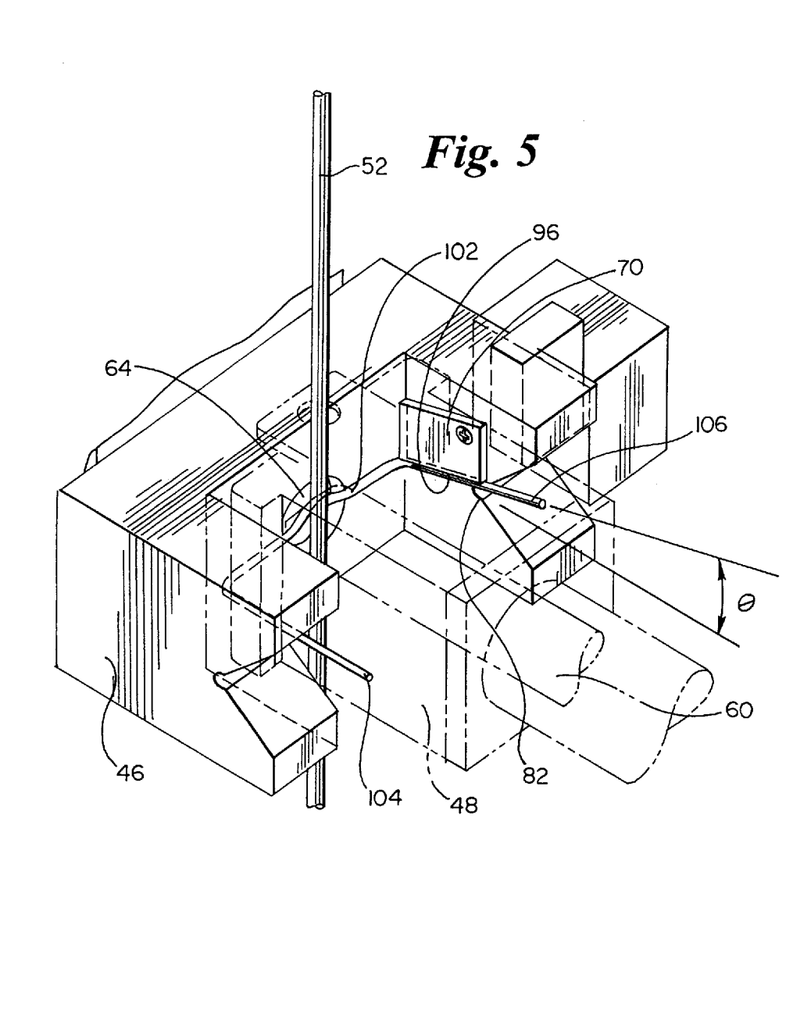
FIG. 5 is a fragmentary perspective view similar to FIG. 4, having die assembly in closed position.
Figure 6:
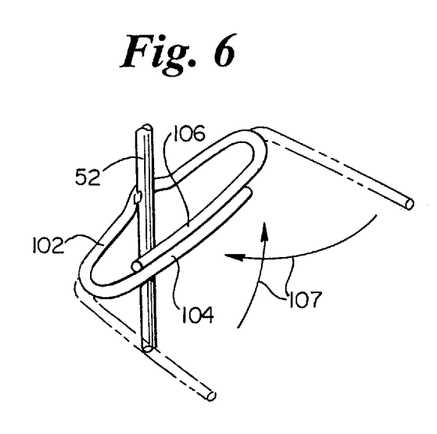
FIG. 6 is a fragmentary perspective view of a wreath ring segment having rib arms prior to end user folding in phantom and rib arms after manufacture in solid lines.

FIG. 4 more clearly illustrates the relationship between rib wire 50, first rib wire guide 82, second rib wire guide 84, and angle plate working surface 96. FIG. 5 illustrates male die 48 in phantom with anode 60 within, after female die 46 has moved to the full proximal extent. The rib wire has been formed into a C-shape having a rib back 102, a right arm 104, and a left arm 106. At the intersection of rib back 102 and spine wire 52, rib back 52 is bent, having been forced into cathode aperture 64, and held between anode 60 and a cathode which advances proximally along spot weld shuttle assembly 58 (illustrated in FIG. 1) (by second pneumatic cylinder 59), through cathode aperture 64. Left rib arm 106 is shown disposed along angle plate working surface 96 angled relative to the plane defined by rib back 102 and right arm 104. In particular, left arm 106 has an offset angle THETA relative to the plane containing right arm 104 and the right portion of rib back 102. FIG. 6 illustrates a rib having back 102, with right arm 104, and left arm 106 folded over each other, in approximately the configuration assumed after the insertion of evergreen or other material as previously described herein and closure of the rib arms (indicated by directional arrows 107). FIG. 6 illustrates how offset angle THETA imparted by angle plate 70 allows the rib arms to be folded without colliding with one another.

Figure 7:
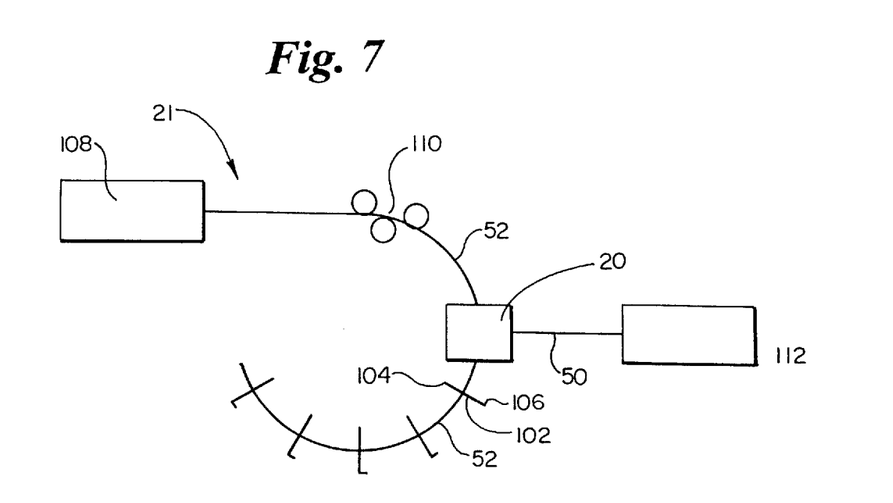
FIG. 7 is a block diagram illustrating operation of the wreath ring apparatus in accordance with the present invention.
Figure 8:
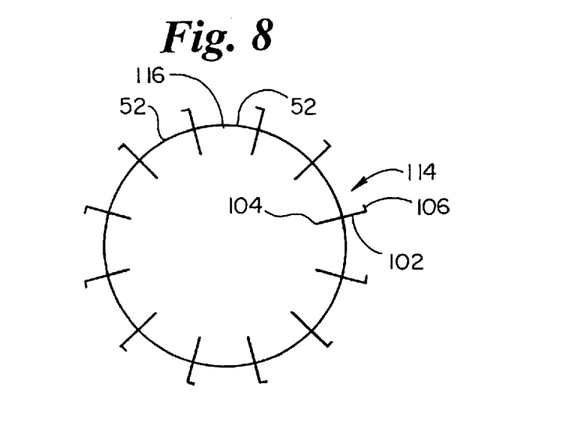
FIG. 8 is a side plan view of a completed wreath ring in accordance with the present invention.

FIG. 7 illustrates a block diagram of a wreath ring making system 21 including wreath ring making machine 20 in accordance with the present invention. System 21 includes a spine wire supply 108, a spine wire bender (roller system) 110 for imparting a curve to spine wire 52, and a rib wire supply 112. After travelling through machine 20, spine 52 has attached a series of arms having back 102, left arm 106 having an offset angle, and right arm 104, projecting out of the plane of the paper. FIG. 8 illustrates a wreath ring 114 having spine wires 52 meeting at a gap 116, ready for spot welding.

In use, machine 20 and system 21 are automated, with a sequence of events repeated for each wreath ring. One embodiment utilizes a Programmable Logic Control (PLC) device for controlling advancement of the wires, cylinder, and cathode shuttle assembly, as well as reading associated limit switches. One preferred sequence of events includes: indexing (advancing) the spine wire 52 a fixed amount; indexing (advancing) the rib wire 50 a fixed amount; actuating the pneumatic cylinder 28 thereby forming a C-shaped rib; actuating the second pneumatic cylinder 59; advancing the cathode shuttle assembly 58 to spot weld the rib 50 to the spine 52; retracting both cylinder 28 and shuttle assembly 59; and repeating (starting) the sequence over. After a fixed or desired number of cycles, in one embodiment sixteen for sixteen ribs on a wreath, the spine wire 52 is cut using an anvil and blade similar to that used for cutting the rib wire 50. The finished wreath ring 114 is then allowed to slide down over an inclined rod to a holding area.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed:

1. An apparatus for use in making wreath rings, the apparatus comprising:
   a frame;
   a spine wire feeding system for feeding a spine wire in a general ring shape;
   a rib wire feed, wherein the rib wire feed feeds a rib wire which is substantially. perpendicular to the spine wire/
   a controller for selectively controlling the rib wire feed and the clip wire feed;
   a rib forming mechanism for shaping and cutting the rib wire to form a wreath holding member, and for coupling the wreath holding member to the spine wire at the location where they cross;
   means for offsetting the wreath holding member; and
   means coupled between the rib forming mechanism and the frame for stabilizing the rib forming mechanism during operation of forming the wreath holding member.

2. The apparatus of claim 1, wherein the rib forming mechanism includes a hydraulically actuated cylinder mechanism, and wherein the means for stabilizing is coupled to the hydraulically actuated cylinder mechanism.

3. The apparatus of claim 2, wherein the means for stabilizing is carried by the cylinder mechanism.

4. The apparatus of claim 2, wherein the means for stabilizing includes a stabilizer bracket fixedly attached to the frame and a stabilizer follower fixedly attached to the cylinder mechanism; and wherein the stabilizer bracket is adapted to slidably mate with the stabilizer follower in the direction of operational movement of the cylinder mechanism, and wherein the stabilizer bracket and the stabilizer follower prohibit movement in a direction transverser to the operational movement of the cylinder mechanism.

5. The apparatus of claim 4, wherein the stabilizer bracket includes a generally longitudinal groove, and wherein the stabilizer follower includes a generally longitudinal ridge shaped for slidable receipt within said longitudinal groove.

6. The apparatus of claim 1, wherein the means for stabilizing stabilizes the rib forming mechanism against movement transverse to the direction of operational movement of the rib forming mechanism.

7. The apparatus of claim 1, wherein the means for offsetting the wreath holding member is coupled to the rib forming mechanism.

8. The apparatus of claim 1, wherein the rib forming mechanism includes a die having a generally U-shaped wire forming surface, and wherein the means for offsetting the wreath holding member includes an angle plate, wherein the angle plate is coupled to the U-shaped wire forming surface.

9. An apparatus for use in making wreath rings, the apparatus comprising:
   a spine wire;
   a rib wire; and
   a rib forming mechanism capable of receiving the spine wire and the rib wire wherein the spine wire has an orientation substantially perpendicular to the rib wire for shaping and cutting the rib wire to form a wreath holding member, and for coupling the wreath holding member to the spine wire, wherein the rib forming mechanism includes an offsetting mechanism for offsetting the wreath holding member.

10. The apparatus of claim 9, further comprising:
    means for feeding the spine wire into the rib forming mechanism; and
    mean for feeding the rib wire into the rib forming mechanism.

11. The apparatus of claim 9, wherein the rib forming mechanism further comprises a first die having a wire forming surface, and wherein the offsetting mechanism includes an angle plate, wherein the angle plate is coupled to the wire forming surface.

12. The apparatus of claim 11, wherein the wire forming surface is generally U-shaped.

13. The apparatus of claim 11, the rib forming mechanism further comprising:
    a second die; and
    means for moving the first die relative to the second die to form the rib wire about the wire forming surface.

14. The apparatus of claim 13, torque stabilizing means for stabilizing the means for moving during movement of the first die relative to the second die.

15. The apparatus of claim 14, wherein the torque stabilizing means stabilizes against forces in a direction generally perpendicular to the direction of movement of the means for moving.

16. The apparatus of claim 9, wherein the wreath forming mechanism forms the rib wire into a generally U-shaped member, and wherein the U-shaped member includes a first leg, a second leg, and an intermediate leg, and wherein the first leg and the second leg are coupled to the intermediate leg at opposite ends, and wherein the offsetting mechanism provides and angular offset to the second leg relative to a plane defined by the first leg and the intermediate leg.

17. A wreath ring making apparatus having:

a female end and a male end;

means for providing force directed proximally along an axis;

means for axially transferring said force, said force transferring means operably connected to said force providing means;

means for feeding and forming a spine wire, said spine wire having a free end, a feed end, and an orientation along an axis substantially orthogonal to said force axis;

means for feeding a rib wire, said rib wire having a free end, a feed end and an orientation along an axis substantially orthogonal to said force axis and substantially orthogonal to said spine wire axis;

a die assembly including a female die and a male die, said female die operably connected to said force transferring means, wherein said force providing means, force transferring means, and female die each have a retracted position and an extended position;

a mounting frame having an axis substantially parallel to said force axis, said frame having a moving female region and a fixed male region, said force providing means fixedly attached to said female region, said male die fixedly attached to said frame proximal region;

said die assembly having a cavity between said female and male dies, said cavity having an open axial inner dimension when said female die is axially retracted and having a closed axial inner dimension when said female die is axially extended, said closed axial inner dimension being substantially less than said open axial inner dimension;

said female die having a wire guide for receiving said rib wire and said male die having a wire guide for receiving said spine wire, said rib and spine wires being substantially orthogonal to each other and to said force axis;

said die assembly having means for forming and cutting said rib wire when said female and male dies are brought into close proximity with each other, said rib wire being cut on said feed end, thereby forming a rib having a lateral back portion having a bend on either side of said spine wire, said rib having arms continuing from said bends with ends disposed in the general direction of said force axis;

said die assembly closed inner dimension being sufficiently small such that when said die assembly is in said closed position, said first and second wires are pressed together and intersect;

said die assembly having a means for spot welding said intersected wires; and means for stabilizing said force transferring means including a stabilizer bracket and a stabilizer follower adapted to slidably mate to each other, wherein said stabilizer bracket is fixedly attached to said frame and said stabilizer follower is fixedly attached to said force transferring means, such that said force transferring means is stabilized against movement transverse to said force axis; and wherein said means for forming said rib wire includes means for angling at least one of said arms away from the plane containing said force axis and said rib wire, such that if said rib arms are bent in on themselves, said arm ends will not collide.

18. A wreath ring making apparatus as recited in claim 17, wherein said female die has a back face substantially normal to said force axis and having two side faces perpendicular to said back face, said side faces being disposed on either side of said spine wire and substantially parallel to said spine wire and said force axis, wherein said male die has a front face adapted to be received by said female die, and wherein said angling means includes said female die having an angle plate fixedly attached on at least one of said inside faces, said angle plate including a working surface substantially perpendicular to said side face and having a proximal portion adjacent said rib wire guide and a distal portion adjacent said female die back face such that as said rib wire is forced toward said female die back face and is bent along said working surface, said rib arm is angled away from the plane containing said force axis and the rib wire guide, such that if said rib arms are bent in on themselves, the arm ends will not collide.

19. A ribbed ring making apparatus having a distal end and a proximal end comprising;

a pneumatic cylinder having a longitudinal center axis and a slidable proximal end capable of providing force directed proximally along said cylinder axis;

a ram operably connected to said pneumatic cylinder proximal end;

means for feeding a spine wire, said spine wire having a free end, a feed end, and an orientation substantially orthogonal to said cylinder axis;

means for feeding a rib wire, said rib wire having a free end, a feed end, and an orientation substantially orthogonal to said cylinder axis and substantially orthogonal to said spine wire axis;

a die assembly including a distal die and a proximal die, said distal die operably connected to said ram, wherein said pneumatic cylinder, ram, and distal die each have a distal, retracted position and a proximal, extended position;

a mounting frame having an axis substantially parallel to said cylinder axis, said frame having a distal region and a proximal region, said pneumatic cylinder fixedly attached to said distal region, said proximal die fixedly attached to said frame proximal region;

said die assembly having a cavity between said distal and proximal dies, said cavity having an open axial inner dimension when said distal die is axially retracted and having a closed axial inner dimension when said distal die is axially extended, said closed axial inner dimension being substantially less than said open axial inner dimension;

said distal die having a wire guide for receiving said rib wire and said proximal die having a wire guide for receiving said spine wire, said rib and spine wires being substantially orthogonal to each other and to said cylinder axis;

said die assembly having means for forming and cutting said rib wire when said distal and proximal dies are brought into close proximity with each other, said rib wire being cut on said feed end, thereby forming a rib having a lateral back portion having a bend on either side of said spine wire, said rib having arms continuing from said bends with ends disposed in the general direction parallel to said cylinder axis;

said die assembly closed inner dimension being sufficiently small such that when said die assembly is in said closed position, said first and second wires are pressed together and intersect;

said die assembly having a means for spot welding said intersected wires; and means for stabilizing said ram including a stabilizer bracket and a stabilizer follower adapted to slidably mate to each other, wherein said stabilizer bracket is fixedly attached to said frame and said stabilizer follower is fixedly attached to said ram, such that said ram is stabilized against movement transverse to said cylinder axis.

20. A wreath ring making apparatus as recited in claim 19, wherein said distal die is female having a back face substantially normal to said cylinder axis and having two side faces perpendicular to said back face, said side faces being disposed on either side of said spine wire and substantially parallel to said spine wire and said cylinder axis, wherein said proximal die is male, having a front face adapted to be received by said female die, and wherein said female die has an angle plate fixedly attached on at least one of said inside faces, said angle plate including a working surface substantially perpendicular to said side face and having a proximal portion adjacent said rib wire guide and a distal portion adjacent said female die back face such that as said rib wire is forced toward said female die back face and is bent along said working surface, said rib arm is angled away from the plane containing the cylinder axis and the rib wire guide such that if said rib arms are bent in on themselves, the arm ends will not collide.

21. A wreath ring making apparatus as recited in claim 19, wherein said stabilizer bracket includes a female channel substantially parallel to said cylinder axis and said stabilizer follower includes a male track slidably received within said female groove.

* * * * *